US005114294A

United States Patent [19]

Attman

[11] Patent Number: 5,114,294

[45] **Date of Patent: * May 19, 1992**

[54] MULTI-DIRECTIONAL LIFTING AND HANDLING ATTACHMENT FOR A BOOM-TYPE VEHICLE

[76] Inventor: Carl P. Attman, 1096 Oak Knoll Dr., Pomona, Calif. 91768

[*] Notice: The portion of the term of this patent subsequent to Dec. 17, 2008 has been disclaimed.

[21] Appl. No.: 674,213

[22] Filed: Mar. 25, 1991

Related U.S. Application Data

[63] Continuation of Ser. No. 361,957, Jun. 6, 1989, Pat. No. 5,073,077.

[51] Int. Cl.[5] .......... B65G 47/00

[52] U.S. Cl. .......... 414/11; 414/785

[58] Field of Search .......... 414/10, 11, 607, 629, 414/630, 631, 633, 632, 634, 641, 642, 660, 663, 672, 687, 688, 697, 705, 722, 743, 786, 785; 52/749, 741, 745, 747

[56] References Cited

U.S. PATENT DOCUMENTS

| | | | |
|---|---|---|---|
| 2,738,081 | 3/1956 | Lee | 414/10 |
| 3,409,158 | 11/1968 | Loll | 414/11 X |
| 3,647,099 | 3/1972 | Carriere | 414/634 |
| 3,688,929 | 9/1972 | McIntyre | 414/705 X |
| 3,754,673 | 8/1973 | Barda et al. | 414/785 X |
| 3,966,070 | 6/1976 | Barth | 414/607 X |
| 4,395,188 | 7/1983 | Kaup | 414/785 X |

FOREIGN PATENT DOCUMENTS

| | | | |
|---|---|---|---|
| 1481089 | 1/1969 | Fed. Rep. of Germany | 414/642 |
| 2739537 | 3/1978 | Fed. Rep. of Germany | 414/705 |
| 1010005 | 4/1983 | U.S.S.R. | 414/607 |
| 1283209 | 1/1987 | U.S.S.R. | 414/607 |

*Primary Examiner*—Frank E. Werner

*Attorney, Agent, or Firm*—Blakely, Sokoloff, Taylor & Zafman

[57] ABSTRACT

An attachment to the boom of a boom-type vehicle for lifting and supporting a panel assembly of the type having a panel and a purline. The purline is securely attached to the panel and disposed at an angle thereto. The attachment comprises attachment devices connectable to a forward end of the boom of the vehicle for supporting at least a portion of the purline and at least a portion of the panel. The attachment devices provide selective movement between the purline, the panel, and the boom for permitting the panel assembly to be manuvered in the desired manner at the construction site. A panel handler assembly is connectable to a forward portion of a mast assembly. The panel handler assembly includes a rearwardly disposed purline supporting portion securably connectable to the mast assembly; a forwardly disposed panel supporting portion rotatably attached to the purline supporting portion; and devices for providing selective rotation of the panel supporting portion relative to the purline supporting portion along an axis parallel to a plane supporting a forward portion of the mast assembly. The attachment provides versatile multi-directional lifting and handling capabilities which have been unachievable in prior art attachments to boom-type forklifts.

8 Claims, 7 Drawing Sheets

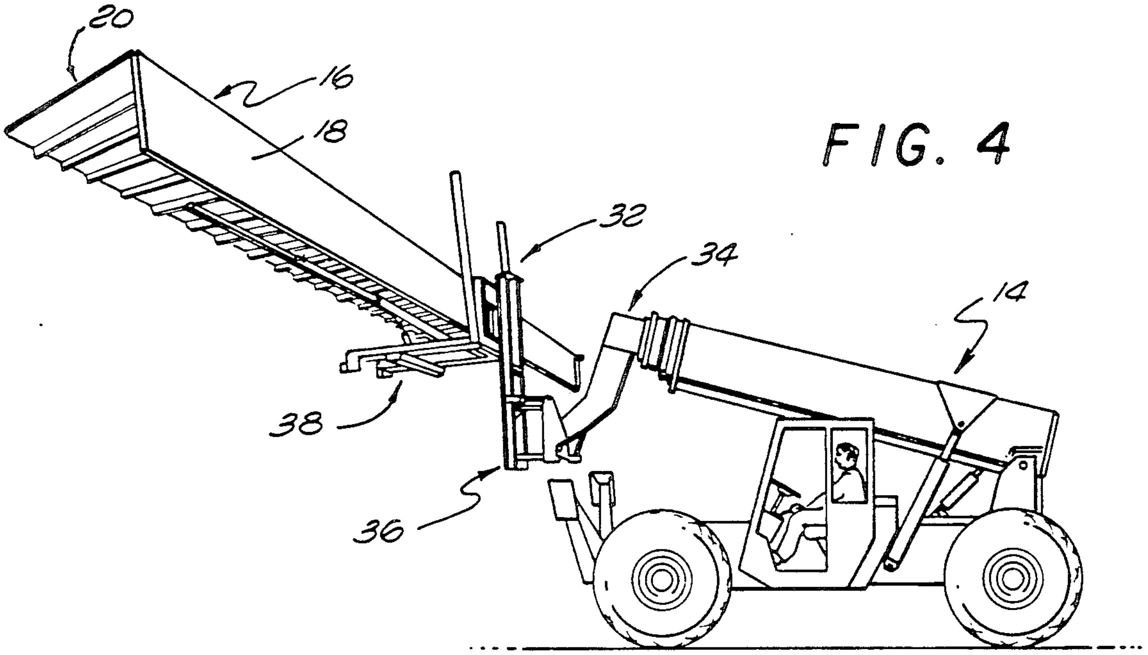
FIG. 4
FIG. 5
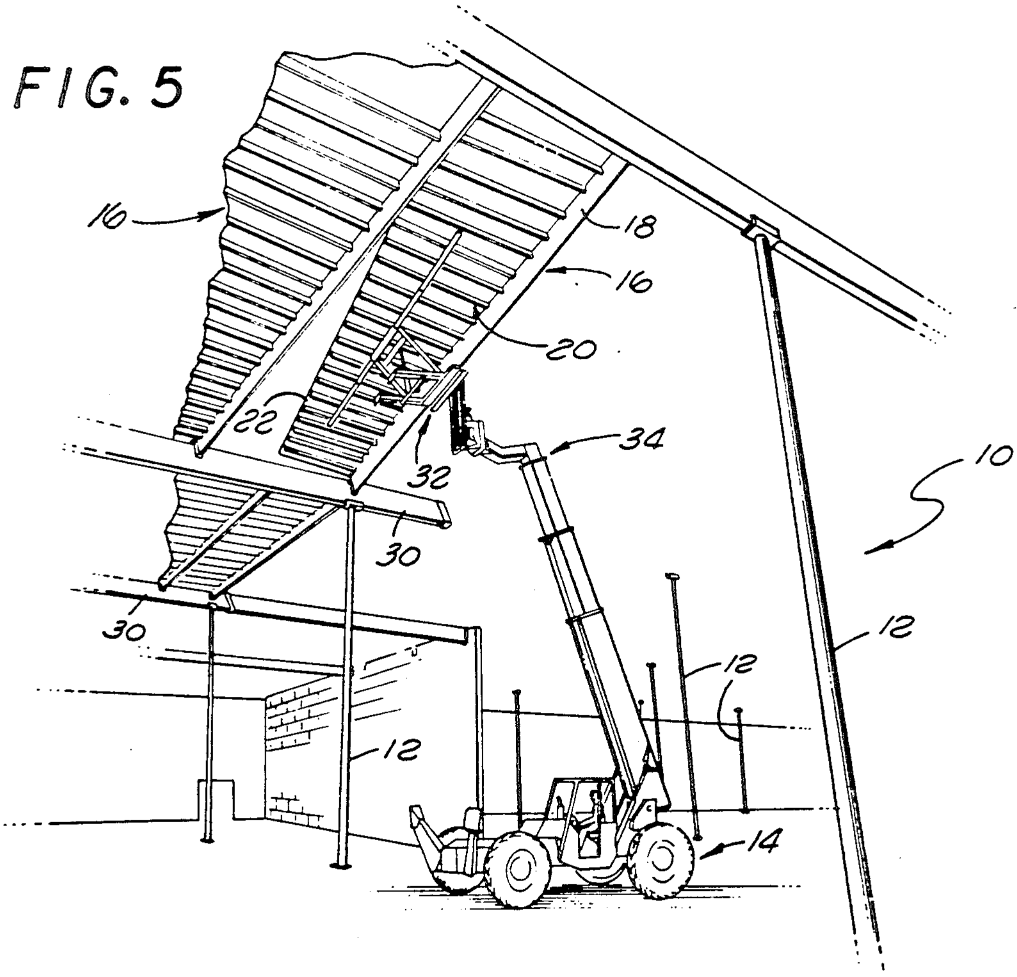

FIG. 6
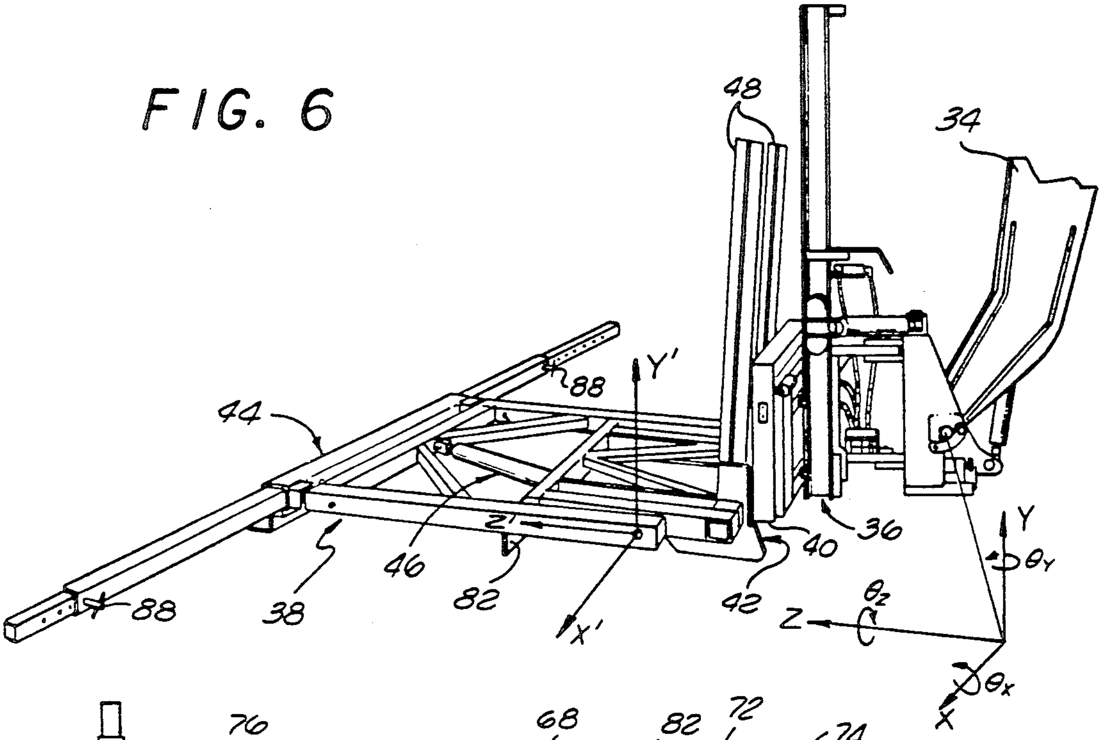
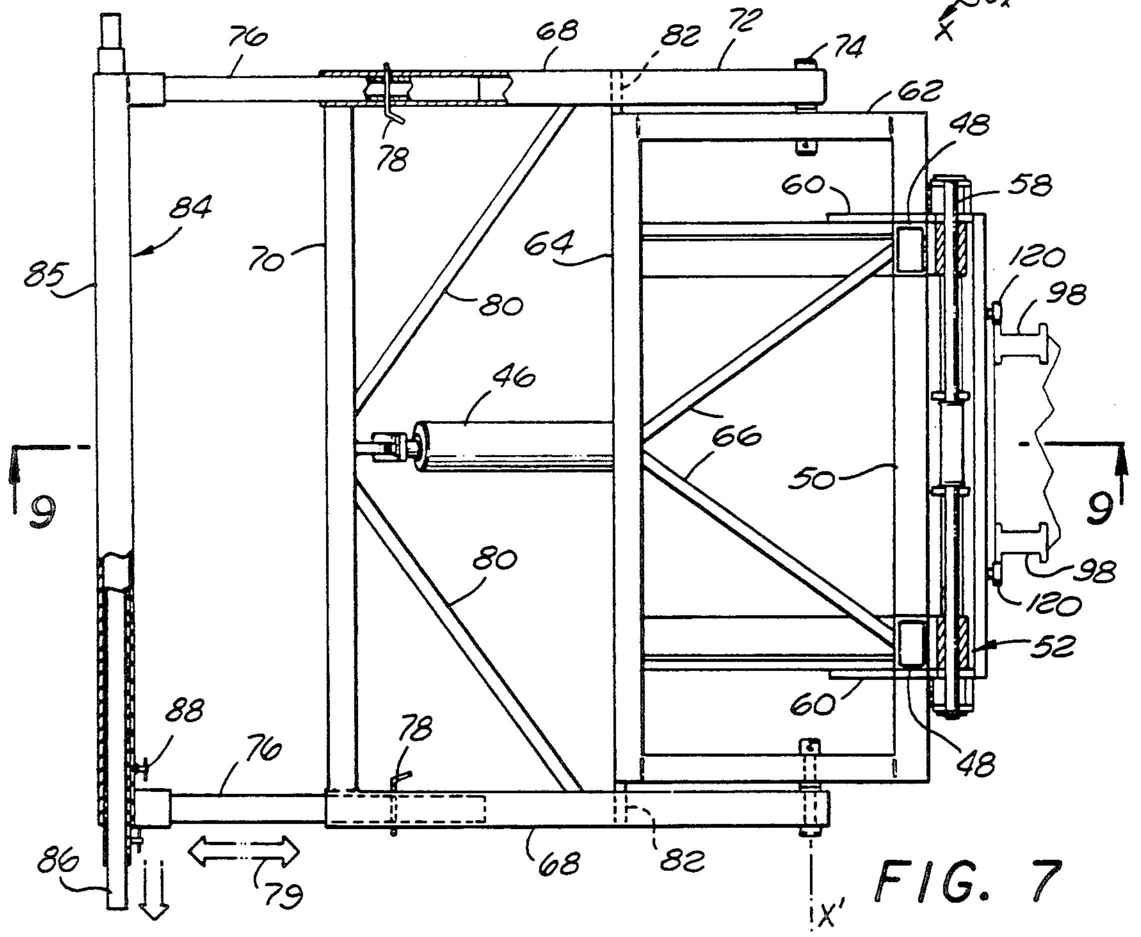
FIG. 7

FIG. 8
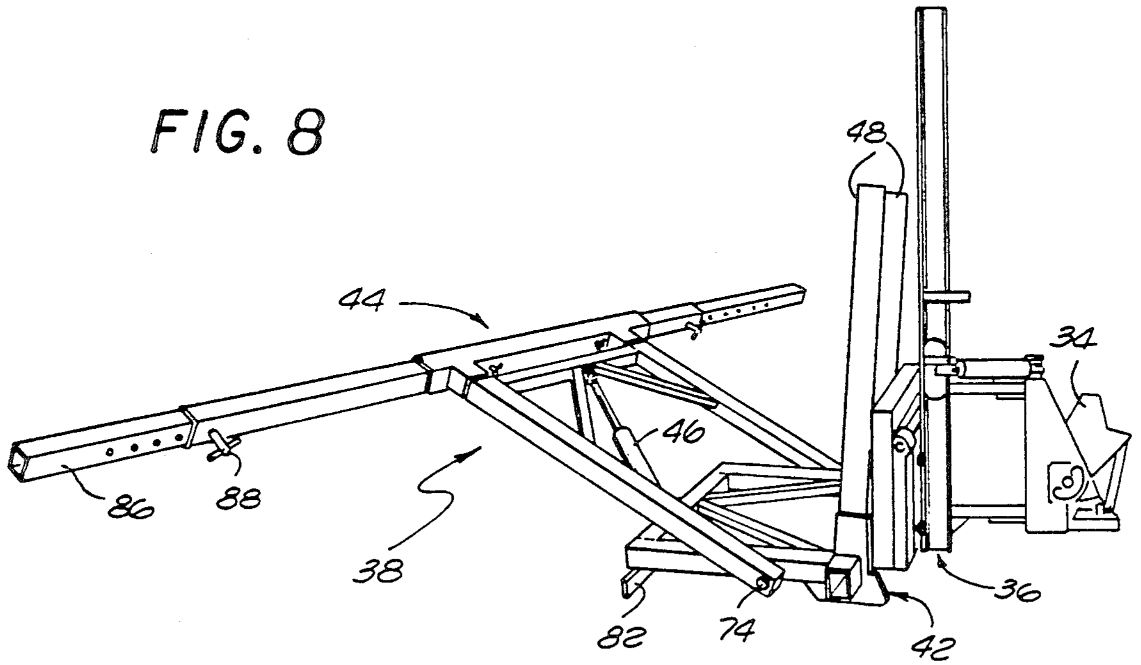
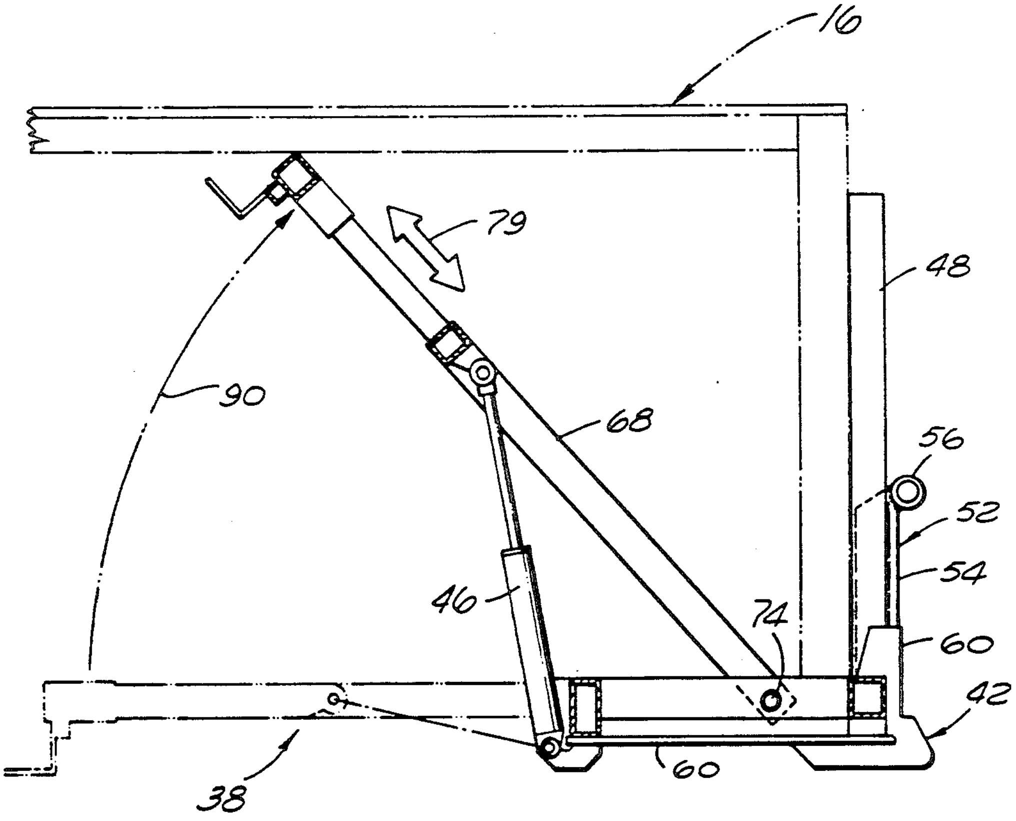
FIG. 9

FIG. 12
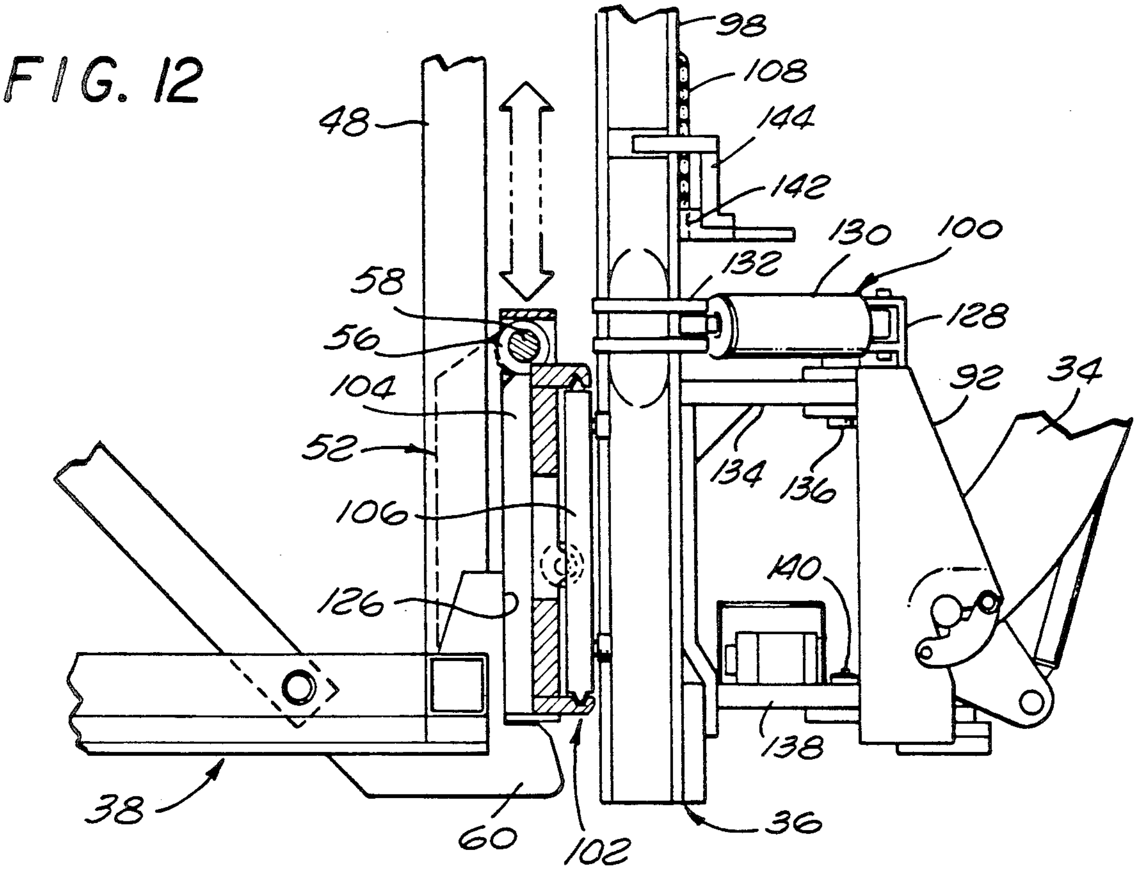
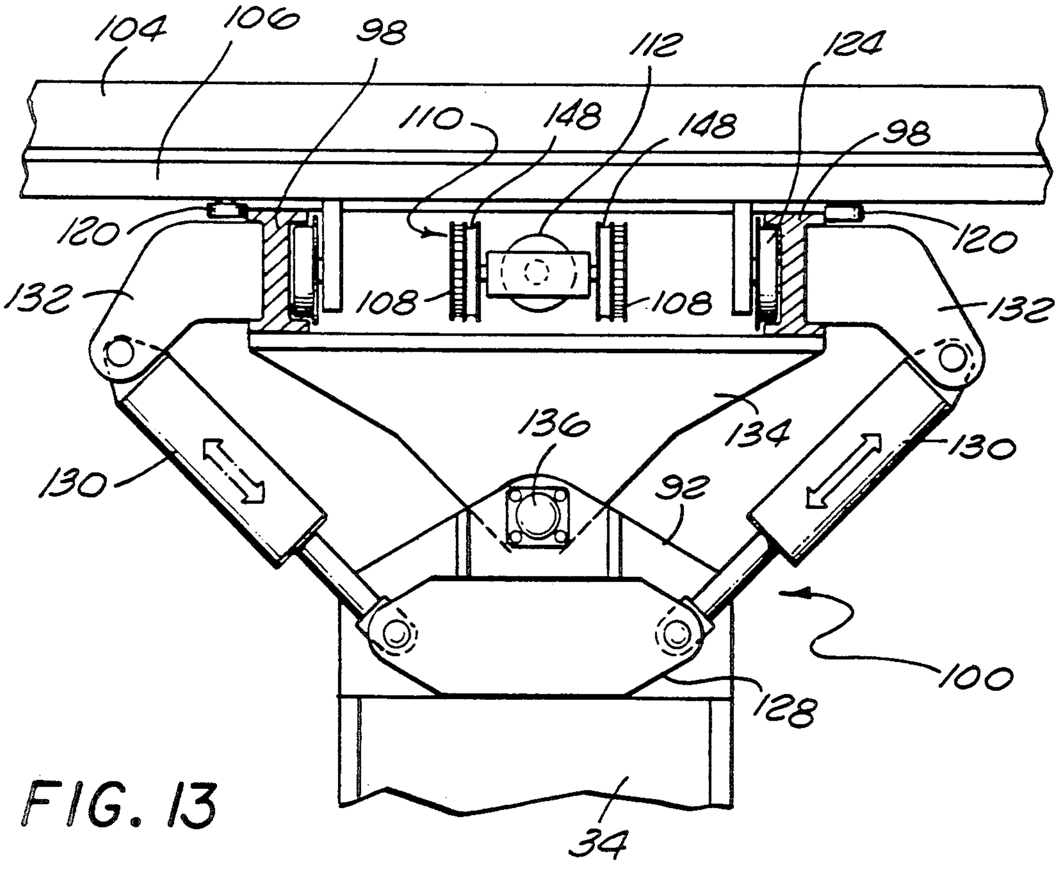
FIG. 13

MULTI-DIRECTIONAL LIFTING AND HANDLING ATTACHMENT FOR A BOOM-TYPE VEHICLE

The present application is a continuation of application Ser. No. 361,957 filed on Jun. 6, 1989, now U.S. Pat. No. 5,073,077.

BACKGROUND OF THE INVENTION

1. Field of the Invention

The present invention relates to handling and lifting attachments for boom-type vehicles and more particularly to an attachment which is particularly adaptable for use with a panel assembly of the type having a purline and a panel, the purline securely attached to the panel and disposed at an angle thereto.

2. Description of the Related Art

Modern techniques for constructing tilt-up type buildings involves installing spaced, vertical columns. Roof panel assemblies are also generally constructed (or at least stored) at one location at the construction site and must be transported via a boom-type vehicle through the columns to their desired point of installation. Referring to FIG. 5 of the drawings, which illustrates the environment in which the present invention operates, it can be readily seen how a navigational dilemma exists while transporting panel assemblies.

In this figure, the construction site is designated generally as 10. The vertical spaced columns 12 provide difficult obstacles for the boom-type vehicle 14 carrying a load as it navigates from the panel assembly storage area (not shown) at one area of the construction site to the area of installation shown in FIG. 5. It can be seen in this figure, as well as by reference to FIG. 2, that the typical roof panel assembly, designated generally as 16, includes a purline 18 attached to a panel 20. The panel 20 typically includes a plurality of plywood panels 22 nailed to a plurality of parallel spaced 2×4's, labeled 24. The panel assembly is typically about 50 feet wide. The panel assembly 16 typically further includes first metal clips 26 at the purline ends and second metal clips 28 at the ends of the members 24, as shown in FIG. 3.

Referring again to FIG. 5, the panel assembly 16 is transported to the point of installation, and the panel assembly 16 positioned so that the 2×4 clips 28 (not shown in this figure) fit over a purline 16 of a previously attached panel assembly 16 and the purline clips 26 engage structural beams 30, the panel assembly 16 then being securable in its position. The resulting roof structure is illustrated in FIG. 1.

Referring again to FIG. 5, it is noted that an attachment 32 to a boom 34, is illustrated. Attachment 32 is, in fact, the attachment of the present invention. (The discussion of this drawing, in this section of the patent application, should not be, by any means, construed as an acknowledgment that the attachment is prior art. Its inclusion in this section of the patent application has been made to assist the reader in attaining a better understanding of the environment in which the attachment operates and the problems faced by the present inventors in their endeavors.)

In a typical prior art forklift, a wooden cross member is fixedly attached to the fork tips to support the panel of the panel assembly. The heel portion of the fork supports the purline. The cross member typically has a height which is lower than the height of the purline and, as a result, the panel sits sloping downward and no adjustment can be made to hold it at a level attitude. When the panel assembly is reaching its point of installation, the ends of the 2×4's first come to rest on the existing purline. The forklift must than be lowered so that the presently installed purline comes to rest on the main structural beams. This presents compound navigational dilemmas and may even sacrifice the structural integrity of the panel assemblies. (The panel assemblies are generally quite flimsy and achieve a good portion of their structural integrity upon being connected to adjacent panels and structural beams.)

As can be seen by the environment illustrated in FIG. 5, maneuvering the tractor through the columns is very difficult. In prior art methods, the crane must be turned 180 degrees in order to pass between the columns. Furthermore, the panel assembly must be raised sufficiently to clear the panel above the structural beams. Navigation is very difficult without the ability of forward reach swing movements and fine adjustments thereof.

U.S. Pat. No. 4,280,785, entitled MULTI-DIRECTIONAL LIFTING AND HANDLING ATTACHMENT FOR A CRANE BOOM, issued to R. G. Albrecht, discloses a multi-directional lifting and handling device mounted on the end of a standard telescoping crane boom. The elongated generally fore and aft main frame of the device includes a hydraulic rotary actuator which selectively rotates a pivotally connected sub-frame about a transverse, substantially horizontal axis. A cradle-like framework, in turn, is rotatably connected to the sub-frame and is selectively rotated by a second hydraulic actuator, the cradle-like framework being rotatable about a longitudinal generally fore and aft axis. Work pieces, such as pipes, beams, or the like are detachably secured in the cradle-like framework by flexible chain straps which form a U-shaped clamp about the workpiece, the chain straps being easily attached to and detached from the load, facilitating quick loading and unloading of the object to be moved.

U.S. Pat. No. 4,553,899, entitled HIGH LIFT TRUCK WITH TELESCOPING BOOM ASSEMBLIES, issued to R. Magni, discloses a high lift truck with a first telescopic boom. Its essential feature, basically, is that of providing a second telescopic boom fixed immovably to the top end of the first raise-and-lower boom which is likewise telescopic, and hinges at the bottom with a mounting on the truck axis; the two booms thus associated, creating an obtuse angle such that the second boom will project forward along the line of the truck axis when the first boom is fully raised.

U.S. Pat. No. 4,382,743, entitled LOADING APPARATUS WITH A TILTABLE AND EXTENDABLE FORK CARRIAGE MOUNTED THEREON, issued to L. H. Newell discloses an apparatus including a mobile chassis having a turntable on which is supported a boom assembly. At the free end of the boom assembly, a forklift carriage is tiltably mounted which can be extended and retracted relative to the boom assembly.

U.S. Pat. No. 4,650,389, entitled MECHANISM AND METHOD FOR POSITIONING A FENDER ON A DOCK VERTICAL WALL, issued to P. J. Mulqueen, discloses a mechanism for positioning on a dock vertical wall a fender including spaced openings, the mechanism comprising a movable support, a first arm pivotally attached to the movable support, a first hydraulic cylinder piston rod assembly for pivoting the first arm, a second arm pivotally attached to the first arm, means for pivoting said second arm, a plurality of spaced projections attached to and extending from the second arm, and pins for releasably securing the projections in the spaced openings in the fender.

U.S. Pat. No. 4,082,197, entitled ARTICULATED HIGH LIFT VEHICLE, issued to R. N. Stedman discloses a vehicle comprising first and second frame assemblies pivotally connected together and actuating means, preferably extensible and retractable steering cylinders, interconnected between the frame assemblies to selectively pivot them relative to each other.

U.S. Pat. No. 4,583,907, entitled EXTENSIBLE APPARATUS, issued to R. J. Wimberley, discloses a flexible extensible apparatus for employing an end-use work tool for one of multiple purposes characterized by combinations of a pivotal base; main support structure; pivotally mounted support structure; extensible base unit having first and last respective pairs of booms and levers; attachments for the work tool; and a plurality of extension units each comprising respective pairs of booms and levers.

Thus, from the above recital of the problem to be faced and the above descriptions of references revealed in a patent search, it can be seen that prior art methods of attempting to solve the problems associated with present Applicant's endeavors is lacking. As will be disclosed below, the present invention provides an improved attachment for a boom-type vehicle which provides extremely versatile multi-directional lifting and handling capabilities. The present invention is particularly adaptable for use with a panel assembly of the type having a panel and a purline, the purline securely attached to the panel and disposed at an angle thereto.

SUMMARY OF THE INVENTION

An attachment to the boom of a boom-type vehicle is disclosed for lifting and supporting a panel assembly of the type having a panel and a purline. The purline is securely attached to the panel and disposed at an angle thereto. The attachment comprises attachment means connectable to a forward end of the boom of the vehicle for supporting at least a portion of the purline and at least a portion of the panel. The attachment means provides selective movement between the purline, the panel, and the boom for permitting the panel assembly to be maneuvered in the desired manner at the construction site.

The attachment preferably includes a mast assembly connectable to the forward end of the boom of the vehicle. The mast assembly includes means for providing selective vertical translation of a forward portion of the mast assembly relative to the boom, along a Y-axis defined by an X-Y-Z rectangular coordinate system, the Y-axis being substantially perpendicular to the surface upon which the vehicle is operating. The mast assembly also includes means for providing selective rotation of the forward portion of the mast assembly relative to the boom, about the Y-axis. Furthermore, means are included for providing selective horizontal translation of the forward portion of the mast assembly relative to the boom, along an X-axis orthogonal to a Y-Z plane defining the orientation of the boom.

A panel handler assembly is connectable to the forward portion of the mast assembly. The panel handler assembly includes a rearwardly disposed purline supporting portion securably connectable to the mast assembly; a forwardly disposed panel supporting portion rotatably attached to the purline supporting portion; and, means for providing selective rotation of the panel supporting portion relative to the purline supporting portion along an offset axis, X', parallel to a plane supporting the forward portion of the mast assembly.

The attachment provides versatile multi-directional lifting and handling capabilities which have been unachievable in prior art attachments to boom-type forklifts. It is understood that use of the term purline herein is not limited to a panel assembly such as those only used on roofs and may apply to any panel assembly having one portion disposed at a relative angle to a second portion.

BRIEF DESCRIPTION OF THE DRAWINGS

FIG. 4 is a side perspective view of a boom-type vehicle supporting the attachment of the present invention.

FIG. 5 is a view of the construction site, illustrating a panel assembly being installed.

FIG. 6 is a side perspective view of the attachment of the present invention in a lowered position.

FIG. 7 is a top view of the panel handler assembly of the present invention, partially in cross-section.

FIG. 8 is a side perspective view of the attachment of the present invention with the adjustable support arm assembly shown in a raised position.

FIG. 9 is a side view of the panel handler assembly of the present invention, in partial cross section, illustrating the ability of the adjustable support arm assembly to be raised, this figure being taken along line 9—9 of FIG. 7.

FIG. 12 is a side elevational view of the mast assembly and a portion of the panel handler assembly, partly in cross-section.

FIG. 13 is a top plan view of the mast assembly, in partial cross-section.

The same elements or parts throughout the figures of the drawings are designated by the same reference characters.

DETAILED DESCRIPTION OF THE PREFERRED EMBODIMENT

Figure 1:
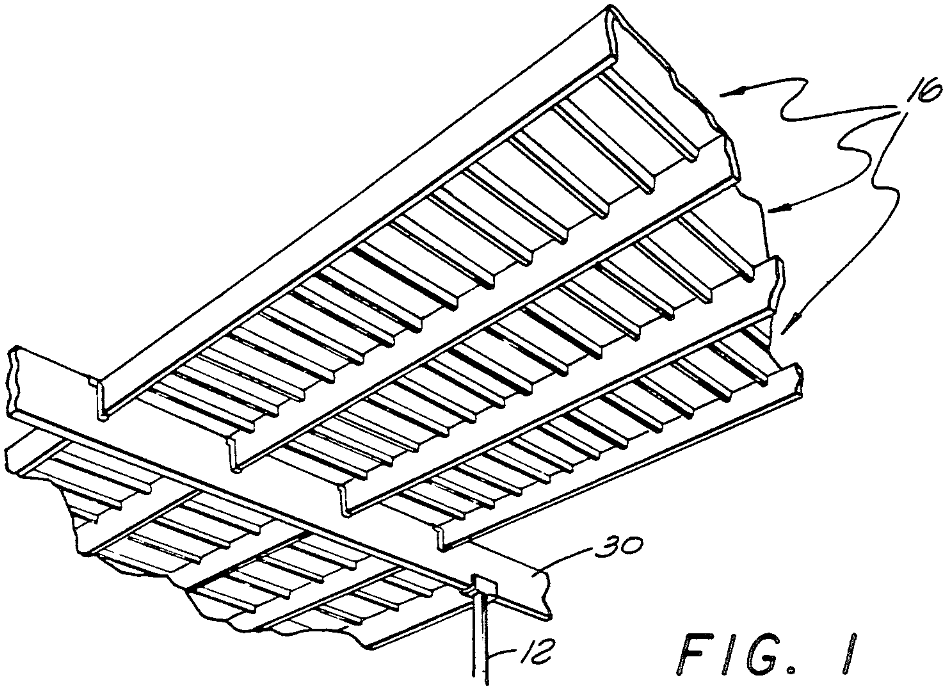
FIG. 1 is a perspective view of a plurality of attached roof panel assemblies connected to a structural beam, the roof panel assemblies being of the type particularly adapted for use with the present invention.
Figure 2:
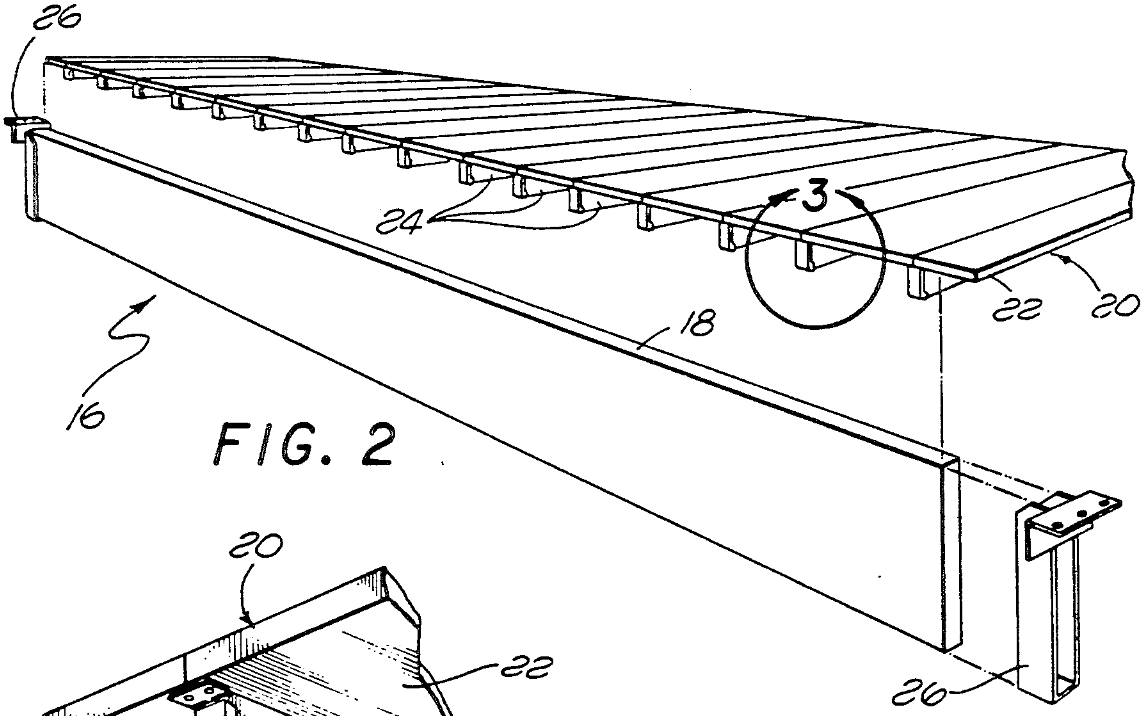
FIG. 2 is an exploded perspective view of a panel assembly of FIG. 1.
Figure 3:
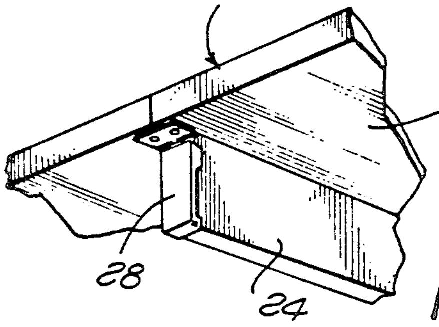
FIG. 3 is an enlarged perspective view of a portion of the panel assembly, taken along curved line 3 of FIG. 2.

Referring again to the figures of the drawings and the characters of reference marked thereon, FIG. 4 illustrates the attachment 32 attached to a forward end of the boom 34 of a boom-type vehicle 14. The attachment 32 comprises means for supporting at least a portion of the purline 18 and at least a portion of the panel 20 of a panel assembly 16. The attachment provides selective movement between the purline 18, the panel 20, and the boom 34 for permitting the panel assembly 16 to be maneuvered in the desired manner at the construction site. The attachment comprises a mast assembly 36 and a panel handler assembly 38.

Referring now to FIG. 6, it can be seen that the mast assembly 36 is connectable to the forward end of the boom 34 of the vehicle. For the purposes of explanation, the relative movement of a forward portion 40 of the mast assembly 36 relative to the boom 34 may be viewed in reference to the rectangular coordinate system X, Y, Z. In this regard, movement can be viewed as translation along one or more of the three rectangular coordinate axes and/or rotation about those three axes. As will be described below, in detail, the mast assembly 36 provides the following three functions:

(a) selective vertical translation of the forward portion 40 of the mast assembly 36 relative to the boom 34, along the Y-axis, the Y-axis being perpendicular to the surface upon which the vehicle is operating;

(b) selective rotation of the forward portion 40 of the mast assembly 36 relative to the boom 34, about the Y-axis (i.e. $\phi_y$); and, (c) selective horizontal translation of the forward portion 40 of the mast assembly 36 relative to the boom 34 along the X-axis which is orthogonal to the Y-Z plane defining the position of the boom 34.

The panel handler assembly, as viewed in a broad context, includes a rearwardly disposed purline supporting portion 42 securely connected to the forward portion 40 of the mast assembly 36; a forwardly disposed panel supporting portion 44 rotatably attached to the purline supporting portion 42; and, hydraulic actuation means 46 for providing selective rotation of the panel supporting portion 44 relative to the purline supporting portion 42 along an offset axis, X', parallel to the forward portion 40 of the mast assembly 36, the X',Y',Z' axes representing an offset rectangular coordinate system.

Referring now to FIG. 6, in conjunction with FIG. 7, it can be seen that the purline supporting portion 42 includes a rigid purline backrest assembly comprising a pair of elongate, parallel, substantially vertical spaced rigid members 48; an elongate, rigid horizontal member 50 integrally connected to the bottoms of the vertical rigid members 48; and a lifting support sub-assembly 52 integrally connected to the vertical rigid members 48 and the horizontal member 50.

As may best be seen in FIG. 9, the lifting support sub-assembly 52 includes two vertically disposed extensions 54, each extension 54 being integral with its associated vertical rigid member 48. Each vertical extension 54 has an upper end with integral attaching eyes 56 for connection thereof with a pin 58 (see FIG. 7) secured to the forward portion 40 of the mast assembly 36. Each lifting support sub-assembly 52 also includes a pair of integral shoes 60, each shoe circumscribing a portion of the intersection between the horizontal member 50 and its associated vertical rigid member 48. The rigid purline backrest assembly is thereby connectable to the forward portion 40 of the mast assembly 36 so as to extend on a plane X'-Y' generally parallel to the forward portion 40 of the mast assembly 36.

The purline supporting portion 42 also includes a rigid base frame assembly comprising a pair of elongate, parallel, substantially horizontal, spaced rigid base members 62 integrally connected to the purline backrest assembly; a transverse horizontal rigid base member 64 integrally connecting the forward ends of the longitudinal base members 62; and a pair of diagonal base members 66 interconnecting a central section of the transverse base member 64 and the horizontal member 50. Thus, the rigid base frame assembly is integrally connected to the lower end of the purline backrest assembly so as to extend forwardly of the purline backrest assembly on a plane X'-Z', generally parallel to the X-Z plane.

The panel supporting portion 44 includes a rigid C-frame assembly comprising a pair of spaced parallel lift arm sub-assemblies 68 and a lift arm cross member 70 integrally attached to the lift arm sub-assemblies 68. Each lift arm sub-assembly 68 includes a lift arm 72 connected at a rear end to longitudinal base member 62 by means of a hinge 74. Each lift arm sub-assembly also includes a telescoping lift arm extension 76 including locking means 78. Utilization of such lift arm extensions 76 allow the attachment 32 to be utilized with varying sizes of panels as shown by the arrows designated 79.

Diagonal members 80 are also attached to the lift arms 68 and lift arm cross member 70 for the required support. A narrow rigid stop member 82 integrally connected to the bottom of transverse horizontal base member 64 provides bottom support for the purline supporting portion 42 and, in addition, as a result of its extension beyond the transverse horizontal base member 64, provides a stop preventing rotation of the lift arm sub-assembly 68 below the elevation of the longitudinal horizontal base members 62.

Attached to the ends of telescoping lift arm extensions 76 is an adjustable support arm assembly 84. The support arm assembly 84 includes a support arm assembly cross member 85 connected to forward ends of the telescoping lift arm extensions 76. A pair of telescoping support arm extensions 86 are provided with locking means 88 to further accommodate different sizes of panels.

A hydraulic actuator 46 is connected at a first end to a central portion of the transverse horizontal base member 64 and at a second end to a central portion of the lift arm cross member 70 with appropriate conventional control means (not shown) for actuating hydraulic actuator 46. The panel supporting portion 44 may be rotated with respect to the purline supporting portion 42, as illustrated by arrow 90 in FIG. 9. Thus, an orientation as shown in FIG. 8 may be utilized to optimally carry the panel 20 in a horizontal position for optimal transportation and installation of the panel assembly 20 and retention of its structural integrity.

In this regard, it is noted that, in use, present Applicant typically stores the panel assemblies 16 in an orientation whereby the lower end of the purline 18 is raised above the ground sufficiently to allow the passing of the panel handler assembly 38 (except, of course, the vertical rigid members 48), while the panel handler assembly 38 is in the orientation shown in FIG. 6. The ends of the panel 20 are kept raised by a block of wood so that the panel 20 is substantially horizontal. The panel supporting portion 44 is then rotated to the position shown in FIG. 8 so that the support arm assembly 84, including the telescoping support arm extensions 86 substitute support for the panel 20 in this position for the wooden blocks when the panel assembly is transported for installation. This enables its structural integrity to be retained and provides easy installation.

It is noted that the fittings, gauges, controls, and flexible conduits necessary for providing a source of regulated power to actuate the hydraulic actuators of this invention are not shown, so as to provide a clear understanding of the novel features of the present invention. It is further noted that these control devices can be located at convenient locations, enabling an operator to maneuver the attachment 32 in the desired fashion.

Figure 10:
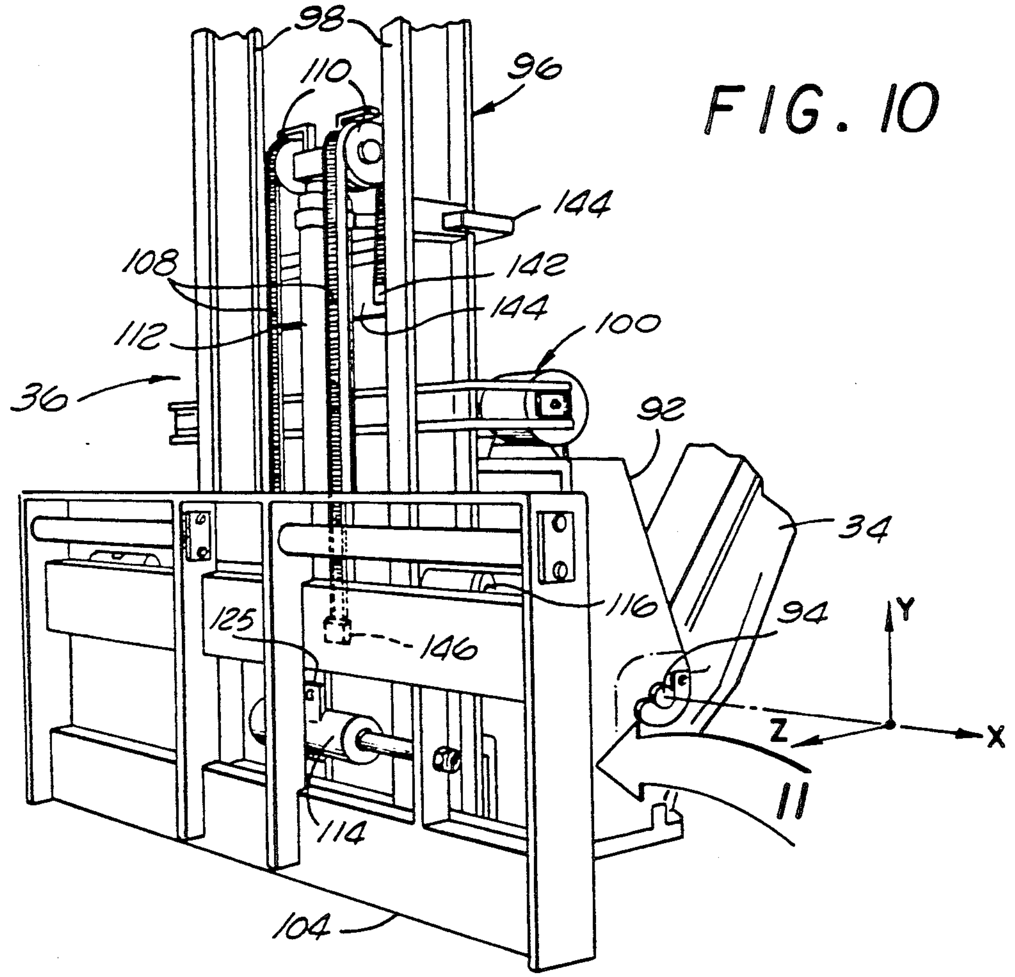
FIG. 10 is a front perspective view of the mast assembly of the present invention, the panel handler assembly removed.

Referring now to FIG. 10, the mast assembly, designated generally 36 is illustrated (shown with the panel handler assembly removed). The mast assembly 36 includes a connecting or a C-hook assembly 92, at the rear end, which connects to a horizontal pivot pin 94 of a male coupler of a boom head 34.

The C-hook assembly 92 is pivotally connected to a vertical upright sub-assembly 96 including a pair of two vertical, integrally connected, upright I beams 98 by a manner including an actuator and swivel means 100 which provides selective rotation along the Y-axis (i.e. $\phi_y$) but prohibits motion along the other degrees of freedom.

Figure 11:
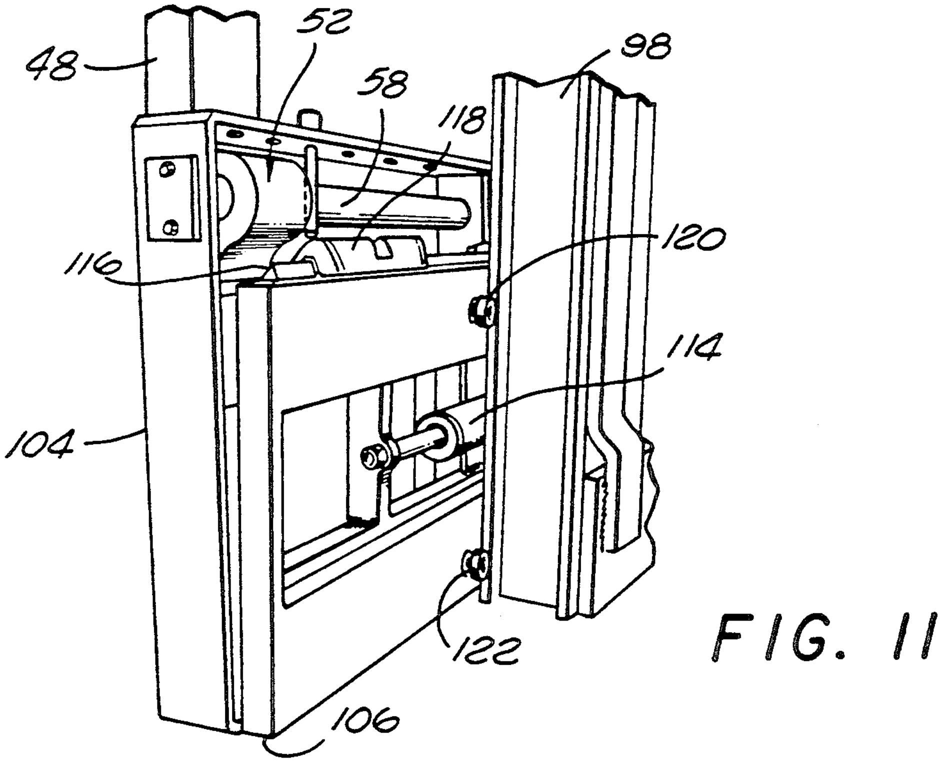
FIG. 11 is a rear perspective view of the mast assembly in the direction of the arrow shown in FIG. 10.

The I beams 98, in turn, are connected to a mast frame or fork carriage assembly 102, which includes a front frame sub-assembly 104 and a rear frame sub-assembly 106, most clearly seen in FIG. 11. The rear frame sub-assembly 106 is connected to the I beams by a manner including a chain means 108, roller means 110, and vertically disposed hydraulic actuator means 112, which permits the desired selective translation of the mast frame assembly 102 relative to the vertical upright sub-assembly 96, along the Y-axis.

The rear frame sub-assembly 106 is connected to the front frame sub-assembly 104 by a manner, including horizontally disposed sideshift hydraulic actuator means 114, for permitting selective adjustment therebetween. An extension 116 on the rear frame sub-assembly 106 cooperating with hangers 118 of the front frame sub-assembly 104 provide the required engagement for sliding operation. Relative side shift between the rear frame sub-assembly 106 and the vertical upright sub-assembly 96 is prohibited by pairs of upper rollers 120, pairs of lower rollers 122 on each end of the I beams 98, and wheels 124 (see FIGS. 11 and 13). The hydraulic actuator 114 is carried at one end by the front frame sub-assembly 104 and at the other end by attaching means 125 secured to the rear frame sub-assembly 104 (see FIG. 10).

Referring now to FIG. 12, the mast assembly 36 is shown connected with the panel handler assembly 38. The lifting support sub-assembly 52 of the panel handler assembly 38 has attaching eyes 56 for engagement with pin 58. The lower part of the front frame sub-assembly 104 abuts rear surfaces 126 of the shoes 60 of the panel handler assembly 38 restricting relative rotation therebetween.

Referring now to FIG. 13 in conjunction with FIG. 12, it can be seen that the swivel means 100 at the upper end of the C-hook assembly 92 includes a pin boss assembly 128 for connecting ends of two horizontal, angularly disposed hydraulic cylinders 130 to the C-hook assembly 92. Each hydraulic cylinder 130 is connected at its opposite end to a respective ear assembly 132, each assembly 132 integral to a vertical I beam upright 98.

An upper triangular plate 134 is attached to the C-hook assembly 92 by means of a hinge assembly 136 which permits the desired selective rotation of the vertical upright sub-assembly 96 along the Y-axis ($\phi_y$), the upper triangular plate 134 providing this motion in cooperation with hydraulic actuators 130 and a lower horizontal triangular plate 138 which is integral to the lower parts of the I beams 98. The lower triangular plate 138 is connected to the C-hook assembly 92 by means of a second hinge assembly 140 (see FIG. 12).

As noted, the desired translation of the mast frame assembly 102 relative to the I beams 98 is accomplished by means including a chain and roller means 108, 110. One end of each of two leaf chains 108 is secured to a chain anchor 142 which is secured to a bracket assembly 144 integral with vertical I beams 98. The other end of each leaf chain 108 is secured to a second chain anchor 146 secured to the rear frame sub-assembly 106. One end of the vertical hydraulic actuator 112 is connected to the roller means or bracket and pulley assembly 110 while the other end is connected to the rear frame sub-assembly 106. Thus, the vertical hydraulic actuator 112 and pulleys provide selective directed translation of the rear frame sub-assembly 106 with respect to the vertical uprights 98 along the Y-axis. (The assembly 110, in addition, carries rollers 148 (see FIG. 13) to accommodate hydraulic tubing (not shown) necessary for operation.)

Figure 14:
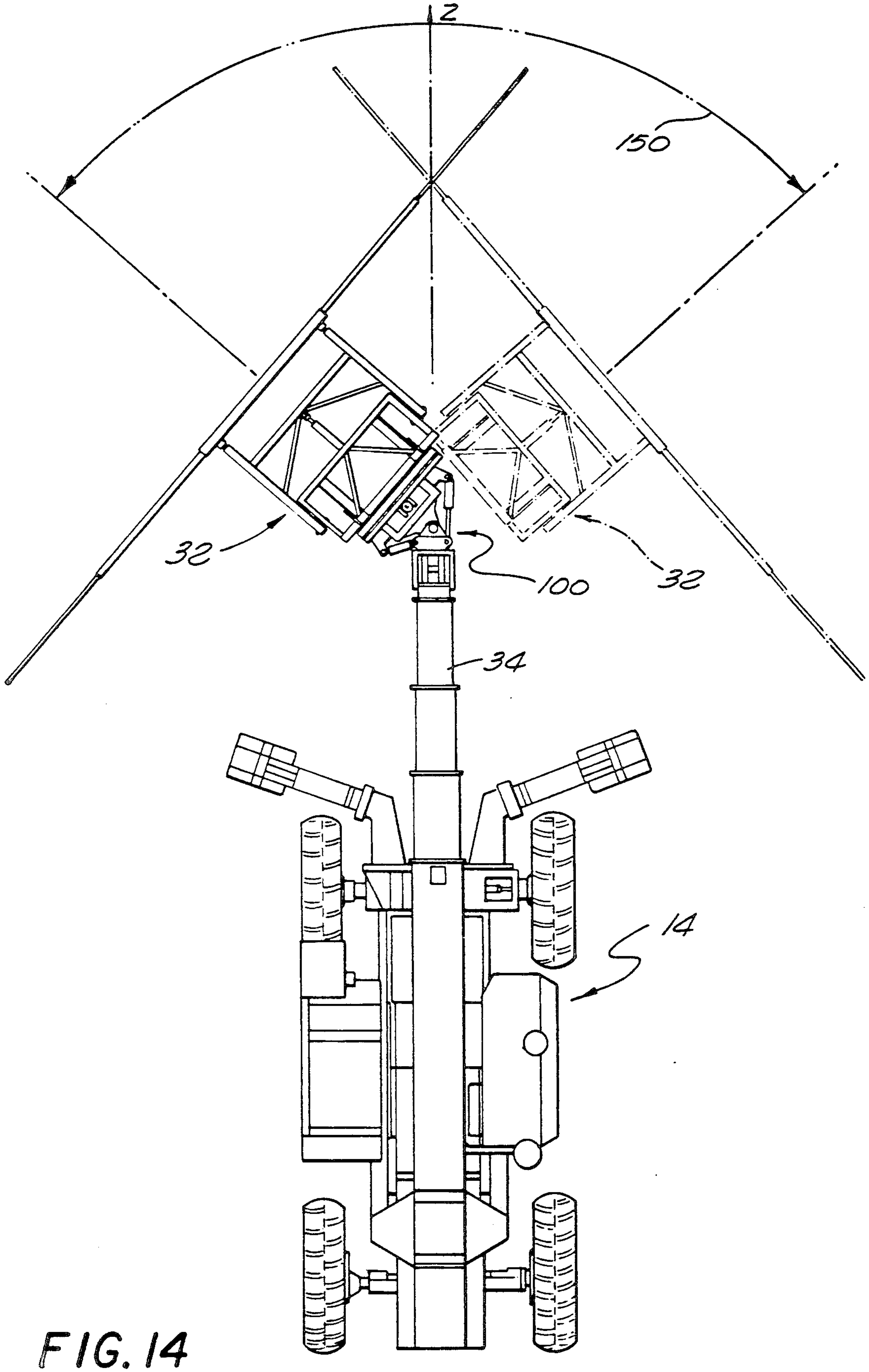
FIG. 14 is a top view of the tractor supporting the attachment of the present invention, illustrating the ability of the invention to swivel approximately 50 degrees on either side of the longitudinal axis of the vehicle.

Referring now to FIG. 14, a top view of vehicle 14 with the attachment 32 of the present invention, is shown. As denoted by arrow 150 , the attachment 32 allows swivel (i.e. $\phi_y$ rotation) of 50 degrees on either side of the longitudinal axis (Z-axis) of the vehicle. This allows efficient maneuvering between the columns.

Obviously, the boom 34, itself, provides coarse translation of the panel assembly 16; however, utilization of the attachment 32 provides another 6 feet of lift which becomes critical given a normal boom is only equipped to adjust to an angle of approximately 75 degrees. With the tight working conditions described, the ability to have fine adjustment is very desirable. Fine side shift adjustment along the X-axis is provided in the range of approximately 6 inches on either side of the Z-axis.

The support arm of the panel handler assembly 38 may be lifted to a height of between 12 inches and 60 inches to accommodate purlines varying in height from 18 inches to 50 inches. The lift arm assembly 72 is designed to extend to a maximum of 8 feet along the Z'-axis from the point of attachment to the mast assembly 36. The support arm assembly 84 is adjustable from a minimum length of 8 feet to a maximum length of 30 feet, to accommodate different panel widths.

In the fully lowered position, i.e. the lift arm 72 folded down, the lift arm sub-assembly 68 and support arm assembly 84 are at an elevation of 11 inches from the support floor. The support arm 84 can be raised from that 11 inch elevation to 70 inches. In addition to the advantages of easy adjustment, use of the telescoping extensions provides ease in transportation.

Obviously, many modifications and variations of the present invention are possible in light of the above teachings. It is therefore to be understood that, within the scope of the appended claims, the invention may be practiced otherwise than as specifically described.

For example, although the panel handler assembly 38 has been described in connection with the mast assembly 36, it is emphasized that it may be used without concurrent utilization of the mast assembly 36. Or, it may be used in conjunction with another type of adjustment means. (Furthermore, the vertical mast 36 may be utilized without concurrent utilization of the panel handler assembly 38. However, the above described utilization of these two assemblies, in combination, provides the optimal attachment for multi-directional lifting and handling purposes.) If the panel handler assembly 38 is used without the mast assembly 36, the lifting support sub-assembly 52 is directly attached to the boom 34.

It is also emphasized that the attachment of the present invention may be used with panel assemblies different in shape than the purline/panel orthogonal arrangement described and may be utilized wherever it is desired that a construction work piece be lifted and supported, that construction work piece having portions thereon having different elevations. Thus, although the invention has been described in connection with its particular use with the panel assembly illustrated in the figures, in view of the above noted broader utility of the invention, it is understood that this described application is purely illustrative and not limiting in nature.

What is claimed and desired to be secured by Letters Patent of the United States is:

1. A panel lifter assembly attached to a vehicle having lifting means and adapted to lift a substantially orthogonal panel assembly that has a panel portion attached to a purline, the panel lifter assembly being oriented in an orthogonal x, y and z axis coordinate system, wherein the x axis coincides with a longitudinal axis of the panel assembly, comprising:

a purline supporting section operatively connected to the vehicle adapted to support the purline of the panel assembly;

a panel supporting section having a first end pivotally attached to said purline supporting section, and a second opposite end with a pair of panel supporting members that extend from said panel supporting section along an axis that is parallel to the x axis such that said panel supporting section can support the panel portion of the panel assembly; and rotation means operatively connected to said purline supporting section and said panel supporting section for controllably rotating said panel supporting section relative to said purline supporting section such that said panel supporting section can be vertically rotated into a position to support an under side of the panel portion of the panel assembly;

whereby the panel lifter assembly can support the panel assembly.

2. A panel lifter assembly attached to a vehicle having lifting means and adapted to lift a substantially orthogonal panel assembly that has a panel portion attached to a purline, the panel lifter assembly being oriented in an orthogonal x, y and z axis coordinate system, wherein the x axis coincides with a longitudinal axis of the panel assembly, comprising:

a purline supporting section operatively connected to the vehicle adapted to support the purline of the panel assembly;

a panel supporting section having a first end pivotally attached to said purline supporting section and a second opposite end with a pair of panel supporting members that extend from said panel supporting section along an axis that is parallel to the x axis such that said panel supporting section can support the panel portion of the panel assembly;

rotation means operatively connected to said purline supporting section and said panel supporting section for controllably rotating said panel supporting section relative to said purline supporting section such that said panel supporting section can be vertically rotated into a position to support an under side of the panel portion of the panel assembly; and, X-axis translational means operatively connected to said purline supporting section and the vehicle for moving said purline supporting section and said panel supporting section along the x axis;

whereby the panel lifter assembly can support and move the panel assembly along the x axis.

3. The panel lifter assembly as recited in claim 2, further comprising Y-axis translational means operatively connected to said X-axis translational means and the vehicle for moving said X-axis translational means along the Y axis, whereby the panel lifter assembly can support and move the panel assembly along the x and y axis.

4. The panel lifter assembly as recited in claim 3, further comprising Y-axis rotational means operatively connected to said X-axis translational means and the vehicle for rotating said X-axis translational means about the y axis, whereby the panel lifter assembly can support and move the panel assembly along the x and y axis and rotate the panel assembly about the y axis.

5. The panel lifter assembly as recited in claim 2, further comprising Y-axis rotational means operatively connected to said X-axis translational means and the vehicle for rotating said X-axis translational means about the y axis, whereby the panel lifter assembly can support and move the panel assembly along the x axis and rotate the panel assembly about the y axis.

6. A panel lifter assembly attached to a vehicle having lifting means and adapted to lift a substantially orthogonal panel assembly that has a panel portion attached to a purline, the panel lifter assembly being oriented in an orthogonal x, y and z axis coordinate system, wherein the x axis coincides with a longitudinal axis of the panel assembly, comprising:

a purline supporting section operatively connected to the vehicle adapted to support the purline of the panel assembly;

a panel supporting section having a first end pivotally attached to said purline supporting section and a second opposite end with a pair of panel supporting members that extend from said panel supporting section along an axis that is parallel to the x axis such that said panel supporting section can support the panel portion of the panel assembly;

rotation means operatively connected to said purline supporting section and said panel supporting section for controllably rotating said panel supporting section relative to said purline supporting section such that said panel supporting section can be vertically rotated into a position to support an under side of the panel portion of the panel assembly; and, Y-axis translational means operatively connected to said purline supporting section and the vehicle for moving said purline supporting section and said panel supporting section along the y axis;

whereby the panel lifter assembly can support and move the panel assembly along the y axis.

7. The panel lifter assembly as recited in claim 6, further comprising Y-axis rotational means operatively connected to said Y-axis translational means and the vehicle for rotating said Y-axis translational means about the y axis, whereby the panel lifter assembly can support, move and rotate the panel assembly along and about the y axis.

8. A panel lifter assembly attached to a vehicle having lifting means and adapted to lift a substantially orthogonal panel assembly that has a panel portion attached to a purline, the panel lifter assembly being oriented in an orthogonal x, y and z axis coordinate system, wherein the x axis coincides with a longitudinal axis of the panel assembly, comprising:

a purline supporting section operatively connected to the vehicle adapted to support the purline of the panel assembly;

a panel supporting section having a first end pivotally attached to said purline supporting section and a second opposite end with a pair of panel supporting members that extend from said panel supporting section along an axis that is parallel to the x axis such that said panel supporting section can support the panel portion of the panel assembly;

rotation means operatively connected to said purline supporting section and said panel supporting section for controllably rotating said panel supporting section relative to said purline supporting section such that said panel supporting section can be vertically rotated into a position to support an under side of the panel portion of the panel assembly; and, Y-axis rotational means operatively connected to said purline supporting section and the vehicle for rotating said purline supporting section and said panel supporting section about the y axis;

whereby the panel lifter assembly can support and rotate the panel assembly about the y axis.

* * * * *